(12) United States Patent
Al-Askari

(10) Patent No.: US 6,424,616 B1
(45) Date of Patent: Jul. 23, 2002

(54) INSERT FOR DRIVES FOR OPTICAL STORAGE MEDIUMS

(76) Inventor: Raad Al-Askari, P.O. Box 43398 Abu Dhabi, Abu Dhabi (AE)

(*) Notice: Subject to any disclaimer, the term of this patent is extended or adjusted under 35 U.S.C. 154(b) by 0 days.

(21) Appl. No.: 09/504,469

(22) Filed: Feb. 16, 2000

(51) Int. Cl.[7] .............................. G11B 3/70; G11B 5/84; G11B 7/26
(52) U.S. Cl. ..................................................... 369/289
(58) Field of Search ................................ 369/289, 292, 369/207, 258, 270, 271, 77.1, 272, 273; 360/99.08, 99.06, 99.05, 137

(56) References Cited

U.S. PATENT DOCUMENTS

| | | | | |
|---|---|---|---|---|
| 741,247 | A | * 10/1903 | Johnson | ....................... 369/271 |
| 3,951,264 | A | * 4/1976 | Heidecker et al. | ........ 206/308.3 |
| 4,274,119 | A | * 6/1981 | Hayward et al. | ......... 360/99.02 |
| 5,105,414 | A | 4/1992 | Funabashi et al. | .......... 369/75.2 |
| 5,109,372 | A | * 4/1992 | Caspers et al. | ............. 369/75.2 |
| 5,119,357 | A | * 6/1992 | Tsuruta et al. | .............. 369/75.2 |
| 5,982,736 | A | * 11/1999 | Pierson | ........................ 369/273 |
| 6,009,060 | A | * 12/1999 | Kim | ........................... 369/77.1 |
| 6,016,298 | A | * 1/2000 | Fischer | ....................... 369/75.1 |

FOREIGN PATENT DOCUMENTS

| | | |
|---|---|---|
| DE | 297 08 978 U1 | 8/1997 |
| EP | 0 375 988 A1 | 7/1990 |
| EP | 0 576 253 A2 | 12/1993 |
| EP | 0 609 617 A2 | 8/1994 |
| EP | 0 927 996 A2 | 7/1999 |
| WO | WO 99/12159 | 3/1999 |

* cited by examiner

*Primary Examiner*—Robert S. Tupper
*Assistant Examiner*—Julie Anne Watko
(74) *Attorney, Agent, or Firm*—Weingarten, Schurgin, Gagnebin & Lebovici LLP

(57) ABSTRACT

By way of an inlay it is possible to load and thus precenter various special formats of optical memory plates such as for example CD, DVD and others. On closing the drive the optical memory plate with special format is exactly and correctly acquired by the drive pin of the drive and comes to bear on the drive plate. Such an inlay according to the invention may be brought on the market in the simplest way. One or more of such inlays are releasably attached on a substrate paper. For use the inlay is pulled from the substrate paper and loaded on the base in the drive within die shoulder for normal CDs or DVDs. A typical CD or DVD with a special format is such in the format of calling cards.

7 Claims, 2 Drawing Sheets

INSERT FOR DRIVES FOR OPTICAL STORAGE MEDIUMS

BACKGROUND OF THE INVENTION

The invention relates to an inlay for drives for optical storage mediums for precentering optical storage mediums with special formats on loading into the drive, according to the earlier part of the independent patent claim.

From DE 297 08 978 (U1) there is known an inlay for a CD drive for the precentering of circular CDs with a diameter between the standard size and the mini-CD. This inlay is an annular disk. The outer diameter corresponds to a normal CD. The inner diameter is larger than the diameter of a mini-CD. This inlay is loaded into the drive tray like a usual CD. It bears with its outer peripheral edge on the centering shoulder for a normal CD. Its edge formed by the inner diameter then forms a new special centering shoulder for a CD with a diameter between the normal and mini CD. Evidently also CDs with special formats may be loaded as long as they come to bear with at least three peripheral points on the new special centering shoulder. For all other intermediate formats this inlay may not be used. If again a usual CD is to be loaded then the inlay must firstly be removed from the drive. A precentering on loading a CD into a drive is in any case necessary. If a CD is simply placed on the rest surface in the drive tray, then it is not sure that the drive pin of the drive on closing the drive tray may at all be moved into the central drive opening of the CD. Mostly the CD is displaced so much on closing the tray that the drive is even jammed.

Today however there are increasingly different special formats on the market. A few of these are already widely commonplace today. This is particularly the case with the calling card CD. Particularly popular with the general public are also CDs with a heart shape.

BRIEF SUMMARY OF THE INVENTION

It is the object of the invention to provide an inlay which permits various of these special formats of CD or also of DVD to be loaded and precentered into a drive.

This object is achieved by the invention specified in the patent claims.

An advantage of the invention is that various special formats of all types of optical storage mediums such as CD, DVD, magneto-optic disk, etc., by way of the inlay without further changes at the drive may be perfectly and precisely loaded and on closing, the drive remain cleanly and exactly precentered.

A further advantage of the invention lies in the fact that although the inlay may again be removed it does not need to be since it is designed such that optical storage mediums with a standard diameter may also be used when the inlay remains in the drive.

BRIEF DESCRIPTION OF THE DRAWINGS

The invention is hereinafter described in more detail in combination with the drawings. There are shown.

DETAILED DESCRIPTION OF THE INVENTION

The basic concept of the invention lies in the fact that one attaches new positioning contours for the CD and DVD in special formats on the base of a drive. These positioning contours must be such that an optical storage medium may be loaded correctly centered according to its special format. It must then subsequently be so secured in this position that on closing the drive pin may not displace and the drive pin may move into the drive opening of the optical storage medium cleanly and exactly enough. So that this is simply and securely usable then a foil-like thin inlay 1 of plastic, paper, metal or rubber-like material may be used. Various modifications of this basic concept are thus included.

Figure 1:
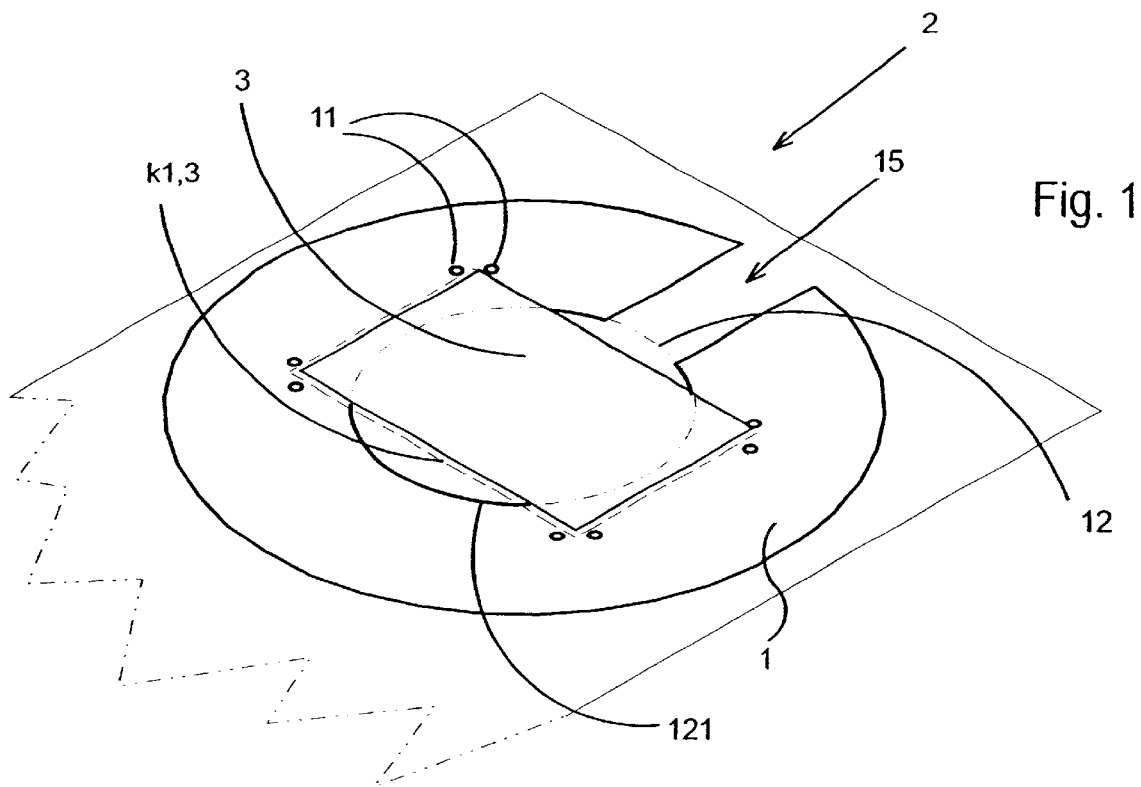
FIG. 1 an inlay according to the invention releasably attached to a substrate foil.

In FIG. 1 it is shown how inlays 1 according to the invention are for example brought onto the market. One or more such inlays 1 are releasably attached to a substrate paper 2. For use the inlay 1 is pulled off the substrate paper 2 and loaded on the base in the drive within the shoulder for normal optical storage mediums. The substrate paper 2 may of course be a plastic or metal foil, a thin cardboard or likewise.

The inlay 1 now has the shape of an annular disk which from one side is provided with a relief 15. The outer diameter of the inlay 1 corresponds to the outer diameter of the usual optical storage mediums. this means cutout for mini 120 mm. The inner diameter of the inlay corresponds at least to that of the drive plate of the drive, mostly however to that of a mini-CD. The relief 15 thus encompasses these inner regions at least around the drive plate and furthermore forms a slot to the outside which corresponds to the read slot for the read head of the drive in the drive base. On loading the inlay, this then with its outer edge bears on the centering shoulder for the normal CD. The inner region of the drive base with the inner centering shoulder for mini-CDs remains free and likewise the read slot in the drive base. On the inlay then there is for example printed a first contour marking k1. This first contour marking k1 corresponds to the format of an optical storage medium in the known format of calling cards 3. To each corner of the calling cards in each case two positioning bodies 11 are attached, adhesed, formed or moulded on the inlay 1. These positioning bodies 11 may have various shapes. Particularly simple and suitable are cylindrical cams with a height of between 0.3 mm and about 1.2 mm It is decisive that they form a bearing edge for bearing the special format of optical storage mediums 3. By way of the inlay 1 then the contour markings for the special formats of the optical storage mediums 3 may be transmitted onto the drive base. This may be effected in that by way of the inlay 1 the positioning bodies 11 attached to it are transmitted according to the contour markings onto the drive base where they remain stuck or in that the inlay 1 remains loaded on the drive base.

Figure 2:
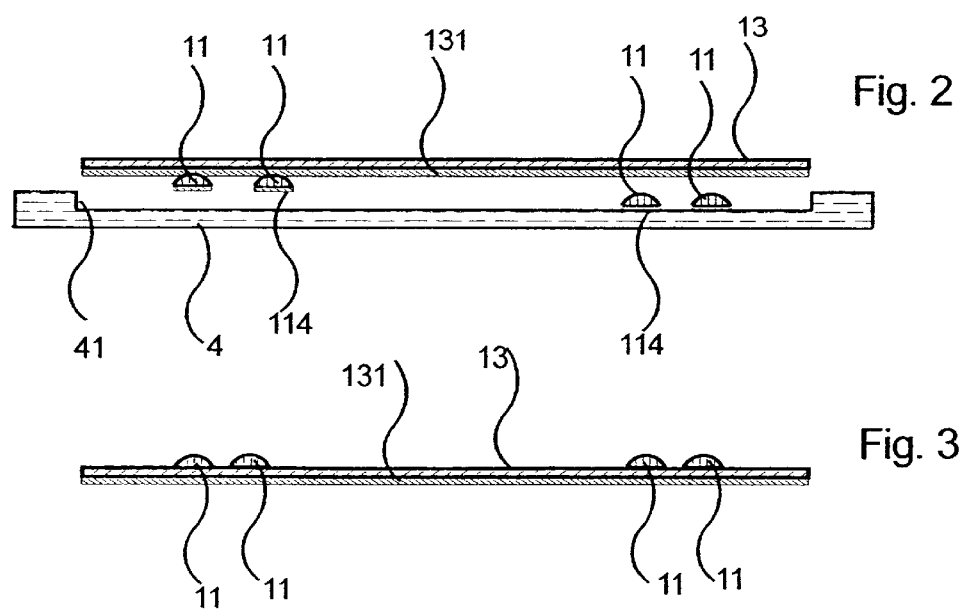
FIG. 2 a first variant of the inlay in combination with a drive tray in cross section.

As is shown in the FIG. 2, the contour markings k1–k4 are printed or impressed on the upper side of the foil with contour markings 13. On the lower side of the foil with contour markings 13 there are located the positioning bodies 11. They adhere lightly on the lower side. For this the lower side is provided with a first adhesive layer 131 of a low adhesive force. The Positioning bodies 11 in turn on the side distant to the foil with contour markings 13 is likewise provided with a second adhesive layer 114. Here however there is present an adhesive layer with a significantly stronger adhesive force. Before use of the inlay 1 any protective paper on the second adhesive layer on the positioning bodies 11 is removed. Then the inlay 1, as shown, with the positioning bodies 11 directed downwards is loaded on the drive base within the centering shoulder for normal CDs such that the relief 15 is located over the read slot. Then in the region of the inlay, contour markings k1–k4 from the upper side are pressed onto the inlay 1. By way of this the desired positioning bodies 11 are pressed on the drive base and remain adhesed there. The inlay 1 may then be removed again. The positioning bodies remain on the drive base and remain adhesed there. The inlay 1 may then be removed again. The positioning bodies remain on the drive base. Their height and nature ensures the normal optical storage mediums on loading simply rest thereon; they however always remain precentered by the centering shoulder. As soon as the drive is closed as is known the optical memory plates by the way of the drive pin rest centered on the drive plate and no longer on the drive base. It is also no longer in abutment on the positioning bodies 11. An optical storage medium in a special format 3, here for example in the format of a calling card is applied onto the corresponding contour marking k1 and is thus precentered between the positioning bodies and is secured against slipping.

Figure 3:
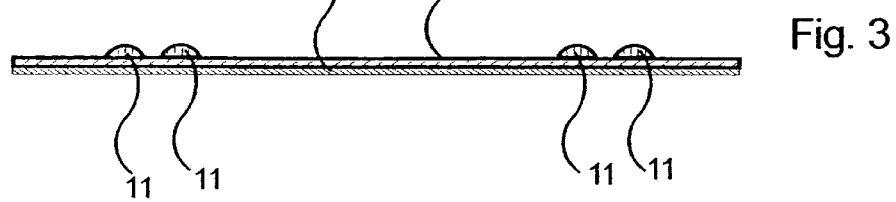
FIG. 3 a further variant of the inlay.

With the inlay according to FIG. 3 the positioning bodies 11 are adhesed on the upper side of the foil with contour markings 13 or are attached in another manner or even moulded into the foil-like material itself. With this variant, after removing a protective layer below the first adhesive layer 131 the foil with contour markings 13 as described above is applied onto the drive base. Subsequently the foil with contour markings 13 is slightly rubbed onto the underlay and pressed on. It remains stuck on. The positioning bodies 11 are located in the region of the countour markings k1–k4 arranged rigidly and are thus at the correct location. The height of the positioning bodies 11, 11' is selected as already described, so that normal optical storage mediums may be used in an unlimited manner.

Figure 4:
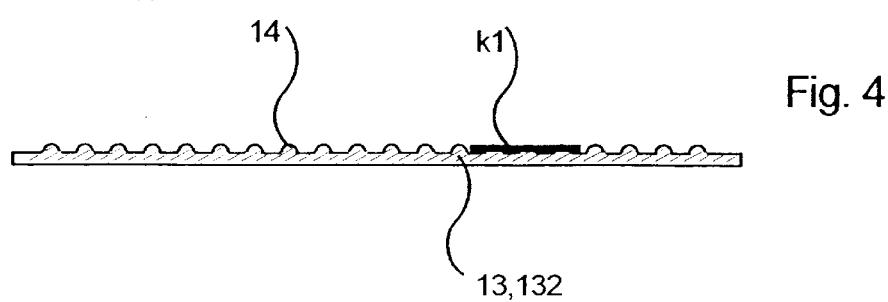
FIG. 4 a third variant of the inlay.

The embodiment form according to FIG. 4 instead of the special positioning bodies 11 arranged outside the respective contour markings k1–k4 comprises a multitude of anti-sliding/anti-slip naps or ribs 14. The inlay I is with this of a material with anti-slip properties or is coated with such a material on the upper side. This may be a plastic or rubber-like material. As an example is a foil 11 manufactured of polyethylene fibres. The contour markings k1–k4 are likewise printed on the upper side. The inlay 1 according to this variant is likewise applied onto the drive base. It may likewise be equipped with an adhesing underside or it may also consist of somewhat stronger material which for example by way of the static effect itself remains slightly adhered on the drive base. A special shape of optical storage medium 3 is now simply loaded into and placed onto the inlay 1 corresponding to the printed-on contour markings k1–k4. It is now held sufficiently adhered in a precentered manner.

In a modification of this variation the inlay 1 additionally or instead of material with anti-sliding/anti-slip properties may consist of magnetised material or be coated with this. This is particularly suitable for use with a special shape of optical storage medium 3, which on its periphery or on the upper. side is at least partly coated with iron-containing or magnetisable material. Such an equipped optical storage medium with a special shape 3 is now simply loaded into and placed onto the inlay 1 corresponding to the printed-on contour markings k1–k4. It is now held sufficiently adhered in a precentered manner. It is evident that these variants may additionally be provided with positioning bodies 11 according to FIG. 3.

Figure 5:
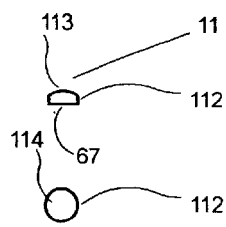
FIG. 5 a general variant of positioning contours.

A general example for positioning bodies 11 is shown in FIG. 5. It is the case of a very simple cylindrical positioning body 11. The cylinder wall forms a bearing surface 12 on which an optical storage medium with a special shape, on loading, comes to bear at at least one point. The positioning body 11 comprises an upper end-face surface 113. This may be convexly curved or polished or provided with a sliding layer. A lower end-face surface in particular for an embodiment according to FIG. 2 is coated with an adhesive layer. The positioning bodies 11 may also have a shaping deviating from this. This is particularly the case when they are worked into the foil themselves as a deformation.

Figure 6:
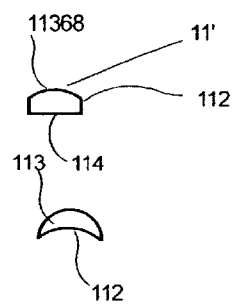
FIG. 6 a special embodiment of positioning contours.

A special shape of the positioning bodies 11' suitable for optical storage mediums in the format of calling cards is shown in FIG. 6. Instead of a cylindrical shape they describe a rounded angle, fitting the rounded corners of such a calling card. In outline they may look like a ¼ moon. The contact surface 12 is curved inwards so that a corner of the calling card comes to bear thereon such that it already only with diagonally oppositely lying positioningbodies 11' is held sufficiently precentered. The positioning body may therefore have a cylindrical, semicircular, angular or rounded-angular shape.

Figure 7:
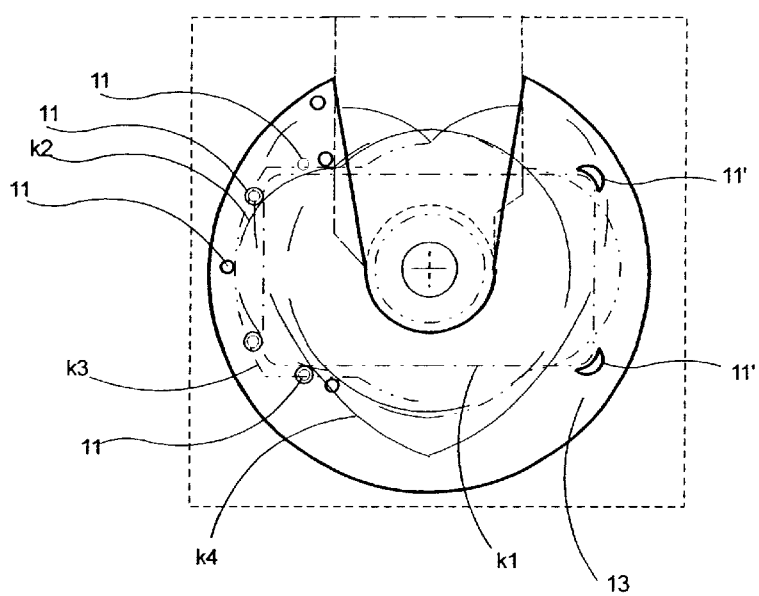
FIG. 7 two variants of inlay aids in a plan view.

An inlay 1 in a plan view is shown in FIG. 7 on the left half of the drawing with positioning bodies 11 for most optical storage mediums with a special shape 3. The foil with contour markings 13 is applied into a drive tray and rests on the tray base. The contour markings k1–k4 are well visible and correspond to the commonly used optical storage mediums with a special shape. In each case outside on the contour markings there are arranged the positioning bodies 11. The number and positions are selected such that most and the most common optical storage mediums with a special shape 3 may be loaded in a precentered manner. On the right half of the drawing there is shown an embodiment specially for calling card CD/DVDs and other optical storage mediums. Here there are only arranged two positioning bodies 11'. It is evident that also both shapes of positioning bodies may be present simultaneously on the foil with contour markings 13.

Figure 8:
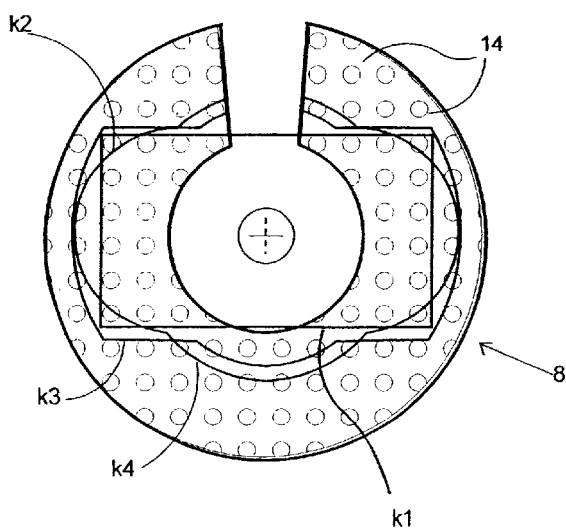
FIG. 8 an inlay aid according to FIG. 4 in a plan view.

An inlay 1 according to the cross section of FIG. 4 is shown in a plan view in FIG. 8 The inlay 1 with the contour markings 13 of the inlay comprises here a matrix of anti-slip naps or ribs 14 distributed over the whole surface. The contour markings k1–k4 are likewise printed or impressed on. With this an optical storage medium with a special shape 3 is simply placed into or onto the fitting contour marking. It is then secured against slipping, displacing or turning not by abutting on the positioning bodies 11 but by the resting on the anti-slip naps or ribs 14. This securement is sufficient for accelerations, which arise on closing the drive or retraction of the drive tray. A normal optical storage medium may be loaded in a completely normal manner. It likewise rests the inlay 1. When the inlay 1 is formed as a foil 13 it, including the naps or ribs, is so thin that the centering shoulder for normal CDs still remains as. a shoulder, even if with a some-what lower shoulder height. The inner centering shoulder for mini-CDs remains also useable since the inlay 1 comprises the corresponding cutout for mini-CDs 12.

A similar embodiment with the magnetised inlay 1 with contour markings 13 corresponds to that described. However a presence of naps or ribs is not necessary. Here the inlay 1 may also be designed without profiling. It is however recommended to equip this with a profiling in the above sense. Optical storage mediums may then be lifted by hand a little bit more easily.

With all these variants of inlay 1 instead of the cutout for mini-CDs a cutout may be formed such that only the drive pin with the drive plate and the read slot remains free for the read head.

Such inlays 1 may remain in the drive. This is because the total height of the foil 13 including naps is less than the deepening of the centering shoulder. If the foil 13 is designed thicker and is for example formed as a mat with anti-sliding/anti-slip properties and/or is magnetised, it must however then be removed again from the drive for using usual CDs or DVDs. Another possibility results when the drive tray from the beginning is manufactured with such an inlay of anti-sliding/anti-slip material. The inlay 1 may even be as one piece with the tray base. Another possibility results in that the tray base is coated with this material, for example this anti-sliding/anti-slip material may be sprayed on.

The Following Description Were Used:
k1 first contour marking
k1–k4 contour markings
1 inlay
2 substrate paper
3 format of calling card
11 positioning body
11 positioning body
12 mini CD
13 foil withg contour markings
14 naps or ribs
15 relief
112 bearing surface
113 upper end-side surface
114 second adhesive layer with position bodies
131 first adhesive layer on foil

What is claimed is:

1. An inlay for a drive for optical storage mediums, for precentering optical storage mediums of secondary formats on loading into the drive, wherein the inlay has an outer diameter which corresponds to a diameter of optical storage mediums of a primary format, wherein the inlay is a foil provided with contour markings, the contour markings printed or impressed on the foil, wherein the contour markings correspond to contours of said optical storage mediums of said secondary formats, and wherein the inlay has a relief which in diameter corresponds at least to a drive plate of the drive, and wherein said relief forms a slot which corresponds to a read slot for a read head of the drive for optical storage mediums, and further comprising positioning bodies releasably adhered on an underside of the foil.

2. An inlay according to claim 1, wherein the positioning bodies further include an underside comprising an adhesive layer.

3. An inlay according to claim 2, wherein the positioning bodies have a cylindrical, hemispherical, angled or rounded angled shape.

4. An inlay according to one of the claim 1, wherein the positioning bodies have a cylindrical, hemispherical, angled shape.

5. An inlay according to claim 1, wherein the foil on its underside is provided with an adhesive layer.

6. An inlay for a drive or optical storage mediums, for precentering optical storage mediums of secondary formats on loading into the drive, wherein the inlay has an outer diameter which corresponds to a diameter of optical storage mediums of a primary format, wherein the inlay is a foil provided with contour markings, the contour markings printed or impressed on the foil, wherein the contour markings correspond to contours of said optical storage mediums of said secondary formats, and wherein the inlay has a relief which a in diameter corresponds at least to a drive plate of the drive, and wherein said relief forms a slot which corresponds to a read slot for a read head of the drive for optical storage mediums, and wherein the inlay contains magnetic material.

7. An inlay for a drive for optical storage mediums, for precentering optical storage mediums of secondary formats on loading into the drive, wherein the inlay has an outer diameter which corresponds to a diameter of optical storage mediums of a primary format, wherein the inlay is a foil provided with contour markings, the contour markings printed or impressed on the foil, wherein the contour markings correspond to contours of said optical storage mediums of said secondary formats, and wherein the inlay has a relief which in diameter corresponds at least to a drive plate of the drive, and wherein said relief forms a slot which corresponds to a read slot for a read head of the drive for optical storage mediums, and further comprising positioning bodies releasably adhered on an underside of the foil, and wherein the positioning bodies have a cylindrical, hemispherical, angled or rounded angled shape.

* * * * *

UNITED STATES PATENT AND TRADEMARK OFFICE
CERTIFICATE OF CORRECTION

PATENT NO. : 6,424,616 B1
DATED : July 23, 2002
INVENTOR(S) : Raad Al-Askari

It is certified that error appears in the above-identified patent and that said Letters Patent is hereby corrected as shown below:

<u>Title page,</u>
Item [57], ABSTRACT,
Line 10, "die" should read -- the --;

<u>Column 2,</u>
Line 47, "comer" should read -- corner --;
Line 65, "Positioning" should read -- positioning --;

<u>Column 3,</u>
Line 29, "variant." should read -- variant, --;
Line 43, "I" should read -- 1 --;
Line 63, "upper." should read -- upper --;

<u>Column 4,</u>
Line 19, "comers" should read -- corners --;
Line 21, "comer" should read -- corner --;
Line 23, "positioningbodies" should read -- positoning bodies --;
Line 44, "8 The" should read -- 8. The --;
Line 58, "as." should read -- as --;
Line 59, "some-what" should read -- somewhat --;

<u>Column 5,</u>
Line 19, "The Following Description Were Used:" should read -- The following descriptions were used: --;
Line 26, "11" should read -- 11' --;

UNITED STATES PATENT AND TRADEMARK OFFICE
CERTIFICATE OF CORRECTION

PATENT NO.    : 6,424,616 B1
DATED         : July 23, 2002
INVENTOR(S)   : Raad Al-Askari It is certified that error appears in the above-identified patent and that said Letters Patent is hereby corrected as shown below:

Column 6,
Line 24, "a in" should read -- in --.

Signed and Sealed this

Twenty-fifth Day of November, 2003

JAMES E. ROGAN
*Director of the United States Patent and Trademark Office*